United States Patent
Petrick

(10) Patent No.: US 7,119,341 B2
(45) Date of Patent: Oct. 10, 2006

(54) SPLIT SCAN LINE AND COMBINED DATA LINE X-RAY DETECTORS

(75) Inventor: Scott W. Petrick, Sussex, WI (US)

(73) Assignee: General Electric Company, Schnectady, NY (US)

(*) Notice: Subject to any disclaimer, the term of this patent is extended or adjusted under 35 U.S.C. 154(b) by 212 days.

(21) Appl. No.: 10/707,348

(22) Filed: Dec. 8, 2003

(65) Prior Publication Data
US 2005/0121616 A1  Jun. 9, 2005

(51) Int. Cl.
*G01T 1/24*  (2006.01)
(52) U.S. Cl. ................................ 250/370.09
(58) Field of Classification Search ........... 250/370.09
See application file for complete search history.

(56) References Cited

U.S. PATENT DOCUMENTS 4,996,413 A  2/1991  McDaniel et al.
6,404,852 B1 *  6/2002  Petrick et al. ............. 378/98.8
6,426,672 B1  7/2002  Petrick et al.
6,437,767 B1 *  8/2002  Cairns et al. ............... 345/100
6,895,077 B1 *  5/2005  Karellas et al. ........... 378/98.3
2001/0033336 A1 * 10/2001  Kameshima et al. ........ 348/300
2002/0085670 A1 *  7/2002  Vafi et al. .................. 378/98.8

FOREIGN PATENT DOCUMENTS

| EP | 0444 869 A | 9/1991 |
|----|-----------|--------|
| EP | 0 792 062 A2 | 8/1997 |
| EP | 1 089 555 A1 | 4/2001 |

\* cited by examiner

*Primary Examiner*—David Porta
*Assistant Examiner*—Djura Malevic
(74) *Attorney, Agent, or Firm*—Peter J. Vogel

(57) ABSTRACT

An x-ray detector (50) includes multiple pixels that receive x-rays. The x-ray detector (50) includes a split scan line (52) that activates the pixels and a data line (54) that conducts charge indicative of the x-rays.

26 Claims, 3 Drawing Sheets

SPLIT SCAN LINE AND COMBINED DATA LINE X-RAY DETECTORS

BACKGROUND OF INVENTION

The present invention relates generally to x-ray imaging systems. More particularly, the present invention relates to improved x-ray detectors and methods of operating the same.

An x-ray system typically includes an x-ray beam source and an x-ray detector. An x-ray beam is directed by the x-ray source across a region of interest of a patient and is detected by the x-ray detector, which in turn generates projection data in response to the x-ray beam.

A solid-state x-ray detector commonly has an array of pixels composed of field effect transistors (FETs) that perform as switches and photodiodes, which detect light. The FETs and the photodiodes are constructed of amorphous silicon, over which cesium iodide (CsI) is deposited. The CsI absorbs the x-rays, generated by the x-ray beam source, and converts them into light energy, which is then detected by the photodiodes. The photodiodes, due to their construction, perform as capacitors and store energy in the form of a charge.

Initialization of the detector occurs prior to an x-ray exposure during a technique that is commonly referred to as "scrubbing the detector" or simply "scrubbing". During scrubbing each photodiode is charged to a determined and initial voltage potential. The detector is then exposed to x-rays, which are absorbed by the CsI. Light that is emitted from the CsI, in proportion to flux of the x-rays, partially discharges the photodiodes. After the conclusion of the exposure, the voltage potential across the photodiodes is returned to the initial voltage potential. The amount of charge required to return each photodiode to the initial voltage potential is related to the x-ray dosage amount detected by each pixel, as integrated by coverage area of each pixel for the length of an exposure.

The detector is read and scrubbed row by row, as controlled through active switching of the FETs. Reading is performed whenever an image produced by the detector contains valuable data, this mainly occurs when the images contain exposure data or offset data. Since data acquired during scrubbing is not of interest it is discarded. Scrubbing is performed to maintain proper voltage bias across the photodiodes during idle periods or to perhaps reduce the effects of lag or incomplete charge restoration of the photodiodes.

Current x-ray detectors, that are used to support high frame rates, often have a split data line design. The x-ray detectors consist of a K column by N row matrix of photodiodes. The data lines are split such that there is a first half of scan lines and a second half of scan lines. Each scan line extends across each half and intersects with each data line. Each data line is split to have a pair of line segments, each line segment corresponds to either the first half or the second half. Readout electronics acquires the charge from the photodiodes, representing an x-ray signal, and converts the measured charge into a digital format. The readout electronics are attached to both segments of the data lines.

The split data line design supports faster acquisition frame rates since two scan lines can be activated simultaneously. Effectively, the detector can be read as though it had two half panels rather than a single full panel, thereby, doubling the acquisition frame rate. However, twice the number of readout channels is required to support all of the data line segments, which increases costs and power consumption and decreases reliability. Doubling the readout electronics increases power consumption of the detector and heat generated therein. Increased heat generation results in increased costs in equipment to remove the heat.

Also, in designing readout circuitry, electronic noise performance is a concern. One technique for achieving low noise performance is to increase bias currents, as described in U.S. Pat. No. 6,426,672 entitled, "Means of Selecting Low Noise Performance or Low Power Dissipation in the Analog Front End of a Custom Integrated Circuit". Such an implementation can be advantageous for those applications that acquire low dose x-ray images, such as in fluoroscopy. By increasing bias currents, the electronic noise is reduced, below the X-ray quantum noise in low dose images. This allows low dose X-ray images to be acquired that are not corrupted by electronic noise.

Thus, there exists a need for an improved x-ray detector that supports high frame rates, consumes less power, has low noise performance, and minimizes heat generation therein.

SUMMARY OF INVENTION

The present invention provides multiple x-ray detectors and corresponding x-ray systems, and methods for operating each detector. An x-ray detector is provided and includes multiple pixels that receive x-rays. The x-ray detector includes a split scan line that activates the pixels and a data line that conducts charge indicative of the x-rays.

The embodiments of the present invention provide several advantages. One such advantage that is provided by an embodiment of the present invention is the provision of a detector having split scan lines. Utilization of split scan lines increases detector read times, which reduces the number of readout channels. The reduction in the number of readout channels reduces cost and power consumption and simultaneously improves reliability of an x-ray detector.

Another advantage that is provided by an embodiment of the present invention is the provision of a detector having non-split data lines. A further advantage that is provided by another embodiment of the present invention is the provision of a detector having combined data lines. Utilization of non-split data lines and combined data lines can reduce the amount of readout electronics and provide the above stated advantages.

Moreover, the embodiments of the present invention are capable of supporting varying degrees of resolution through the ability of combining varying numbers of pixels that are read simultaneously and reducing the amount of time required to completely read a detector, thus increasing the acquisition frame rate when the resolution desired is less than the intrinsic resolution of the detector. This effectively allows an x-ray system to increase frame rate without compromising resolution, which increases application versatility for a particular detector design.

The present invention itself, together with attendant advantages, will be best understood by reference to the following detailed description, taken in conjunction with the accompanying figures.

BRIEF DESCRIPTION OF DRAWINGS

For a more complete understanding of this invention reference should now be had to the embodiments illustrated in greater detail in the accompanying figures and described below by way of examples of the invention wherein.

DETAILED DESCRIPTION

Figure 3:
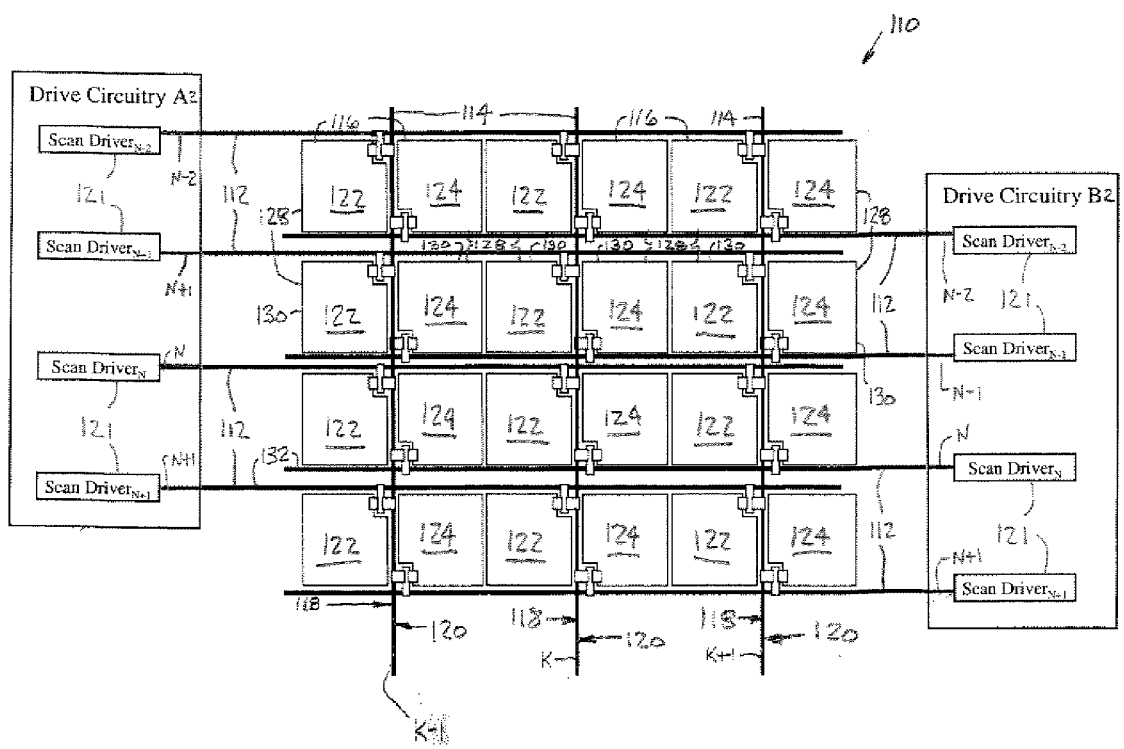
FIG. 3 is a plan view diagram of an x-ray detector, having split scan lines and non-split and combined data lines with pixels coupling both sides of the data lines, in accordance with another embodiment of the present invention.

In the following figures, the same reference numerals will be used to refer to the same components. While the present invention is described with respect to x-ray detectors, corresponding x-ray systems, and methods for operating each, the present invention is capable of being adapted for various purposes and is not limited to the following applications: computed tomography (CT) systems, radiotherapy or radiographic systems, x-ray imaging systems, and other applications known in the art. The present invention may be applied to radiographic detectors, cardiographic detectors, or other detectors known in the art.

In the following description, various operating parameters and components are described for one constructed embodiment. These specific parameters and components are included as examples and are not meant to be limiting.

Figure 1:
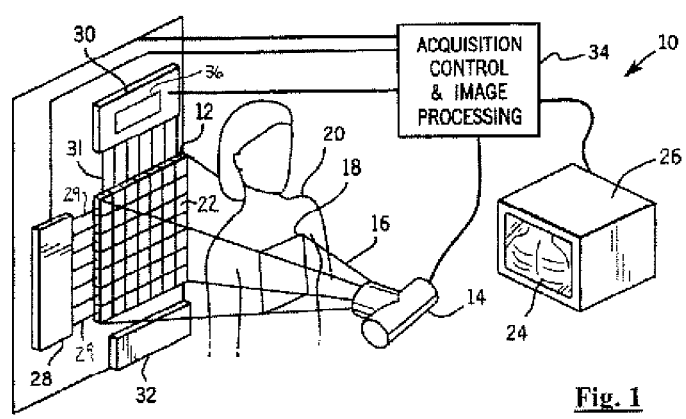
FIG. 1 is a perspective and block diagrammatic view of an x-ray imaging system utilizing an x-ray detector in accordance with an embodiment of the present invention.

Referring now to FIG. 1, a perspective and block diagrammatic view of an x-ray imaging system 10 utilizing a detector array or x-ray detector 12 in accordance with an embodiment of the present invention is shown. The system 10 includes an x-ray source 14 that generates an x-ray beam 16, which is directed to pass through a region-of-interest 18 of a patient 20. The beam 16 is attenuated by an internal structure of the patient 20 and is received by the detector 12.

The detector 12 is divided into multiple pixels 22. During operation of the detector 12, the pixels 22 are scanned by scanning circuitry 28, via scan lines 29, to generate exposure data. The exposure data is received and digitized by the readout electronics or circuitry 30 through use of the data lines 31. Each pixel 22 independently measures intensity of the x-ray radiation received over a corresponding pixel exposed area or photodiode area to generate the exposure data. A photodiode common bias or charge circuit 32 is electrically coupled to the detector 12 and controls the anode voltage of the pixels 22.

An acquisition control and image processing circuit 34 is electrically coupled to the source 14, the scanning circuitry 28, the readout circuitry 30, and the bias circuitry 32 and coordinates operation thereof. The acquisition processing circuit 34 reconstructs an image in response to the exposure data, which is displayed on the monitor 26.

A controller 36 is electrically coupled to both the readout circuitry 30 and the scan circuitry 28. The controller 36 controls the order and speed of readout, as well as the photodiode common bias voltage. Although, the controller 36 is shown as being part of the readout circuitry 30 it may be part of other circuitry, such as the photodiode common bias circuitry 32, the scan circuitry 28, or the image processing circuit 34.

The acquisition processing circuit 34 and the controller 36 may be microprocessor based, such as a computer having a central processing unit, memory (RAM and/or ROM), and associated input and output buses. The acquisition circuit 34 and the controller 36 may simply be formed of logic state machines or of other logic devices known in the art. The acquisition processing circuit 34 and the controller 36 may be a portion of a central main control unit, an electronic control module, or may each be stand-alone controllers, as shown.

Figure 2:
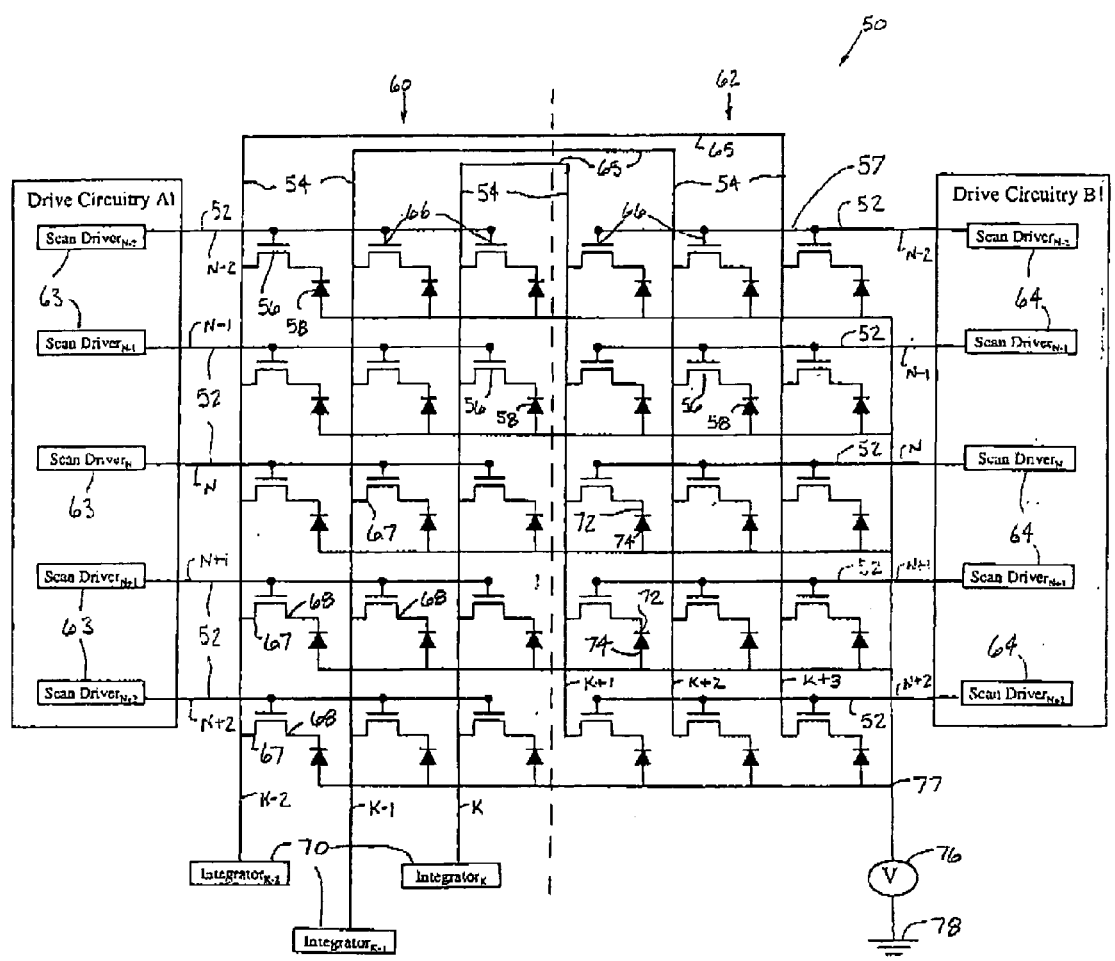
FIG. 2 is a schematic and block diagrammatic view of an x-ray detector, having split scan lines and non-split and combined data lines, in accordance with an embodiment of the present invention.

Referring now to FIG. 2, a schematic and block diagrammatic view of an x-ray detector panel 50 having split scan lines 52 and non-split and combined data lines 54, in accordance with an embodiment of the present invention is shown. The detector 50 includes pixels, represented by and each of which having respective field effect transistors (FET) 56 and photodiodes 58. The scan lines 52 are used to activate the FETs 56 and to simultaneously allow the photodiodes 58 within a particular row segment to charge. Each split scan line has multiple separated activation lines, such as the activation lines 57. The data lines 54 are used to charge the photodiodes 58, thereby collecting exposure or offset data therefrom. The data lines 54 are used by the readout circuitry 30 to restore charge to the photodiodes 58. As each scan line 52 is activated, the photodiodes, within the pixels on the activated scan line, are simultaneously restored to an initial charge. Each data line 54 has an associated readout channel (not shown) from which the acquisition processing circuit 34 receives the exposure data.

The detector 50 has a split design with a left half 60 and a right half 62. The pixels in the left half 60 are coupled to drive circuitry A. The pixels in the right half 62 are coupled to drive circuitry B. Each pixel in the left half 60 is coupled to a common data line with a pixel in the right half 62. Each of the halves 60 and 62 have corresponding sets of pixels, scan lines 52, and data lines 54, some examples of which are stated below. There may be any number of sets and the sets may be of various sizes. The scan lines 52 are split such that the pixels in the left half 60 are coupled to the scan drivers 63 of the drive circuitry A and the pixels in the right half 62 are coupled to the scan drivers 64 of the drive circuitry B.

In one embodiment of the present invention, pixels in the right half 62, are read subsequent to the pixels in the left half 60, alternating between the left half 60 and the right half 62. Although one example order, as to the manner in which the detector is read, is provided and stated above, other read sequences known in the art may be utilized.

In the embodiment of FIG. 2, the data lines 54 are combined as follows: data line$_K$ is coupled to data line$_{K+1}$, data line$_{K-1}$ is coupled to data line$_{K+2}$, data line$_{K-2}$ is coupled to data line$_{K+3}$, etc. The data lines K−2, K−1, and K in the first half 60 are coupled to the data lines K+1, K+2, and K+3 in the second half 62, via connections 65, such that the connections 65 do not cross each other. The data lines K−2, K−1, and K form a first set of data lines and the data lines K+1, K+2, and K+3 form a second set of data lines. The pixels in the first half 60 are part of a first pixel scan set and the pixels in the second half 62 are part of a second pixel scan set. The combined data lines 54 in effect form single data lines. For example, the data lines K−1 and K form a single data line having at least twice the length of each of the data lines K−1 and K. Although the data lines 54 are coupled using a particular connection pattern, they may be coupled using various other connection patterns known in the art.

The connections 65 may be formed within the detector 50, as shown, or may be formed using other techniques known in the art. The connections 65 may, for example, be formed in a separate circuit board and coupled to the detector 50 using flex (not shown). The flex being similar to the flex (also not shown) that may be used to couple the readout circuitry 30 and the scan drivers 63 and 64 to the detector 50.

Since the data lines 54 extend continuously across the detector 50 and are combined, one forth the amount of readout electronics is used over traditional systems that utilize a non-split scan line and a split data line design. Systems that utilize a split data line design typically utilize a pair of readout electronics for each split data line. The use of one forth the readout electronics significantly reduces the power consumption of a detector, as well as heat generated therefrom. Since less power is consumed by the detector 50, it is easier to distribute power to the detector 50. When a power supply, such as batteries, are used to power the detector 50, the weight of the power supply is lighter due to the reduced power demands from the detector 50. Also, since the detector 50 consumes less power, cooling of the detector 50 is simplified. Additionally, since the amount of readout electronics is reduced and the hardware used to cool the detector 50 is simplified, the detector 50 and corresponding circuitry have both improved portability and improved reliability. This is due to fewer and lighter weight components and a fewer number of components being associated with the detector 50.

As such, the incorporation of the full-length data lines 54, which overlap in length, increases flexibility and ease in reading the detector 50. Alternating pixels between the left half 60 and the right half 62 along the scan lines 52 allows the detector 50 to be read in more than one fashion. Alternatively, the left half 60 may be read before the right half 62, or vice versa. This is described in further detail below.

For example purposes, the pixels of the detector 50 are arranged rectangularly in rows and columns, of course other arrangements may be utilized. Each row is designated by the scan lines 52 and each column is designated by the data lines 54. The detector 50 has an approximately centered pixel designated by a scan line N and data line K. Although, a specified number of pixels are shown, the detector 50 may have any number of pixels.

The FETs 56 have gate terminals 66, drain terminals 67, and source terminals 68. The scan lines 52 are coupled between the gate terminals 66 and the drive circuitry A1 and B1. The data lines 54 are coupled between the drain terminals 67 and the integrators 70.

Each of the photodiodes 58 has a cathode 72 and an anode 74. The cathodes 72 are coupled to the source terminals 68. The anodes 74 are coupled to a voltage source 76 at a common contact 77 and have a common contact voltage potential. The voltage source is coupled to a common ground 78. Assuming that each of the FETs 56 perform as an ideal switch, voltage potential across the photodiodes 58 formed by the difference in potential of the data lines 54, as controlled by the integrators 70, and the common voltage potential, can be referred to as the photodiode bias.

In using the FETs 56, as known in the art, the number of electrical contacts to the detector 50 is reduced. Without use of the FETs 56, at least one contact for each pixel is needed to restore the charge of each of the photodiodes 58, in effect limiting the number of pixels that may be manufactured in a single detector. The FETs 56 reduce the number of required contacts to no more than the number of pixels along a perimeter of the detector 50, or in other words the number of rows and columns.

The voltage across the photodiodes 58 is generally controlled by the bias circuit 32. The bias voltage to which the photodiodes 58 are charged is equal to the difference between the voltage level of the common contact 77 and the voltage level of a respective photodiode data line. In order for the photodiodes 58 to store a capacitive charge, they are reversed biased, such that the photodiode anodes 74 are coupled to the common contact 77, which has a voltage potential that is more negative than that of the data lines 54.

On the other hand, potential of the common contact 77, which effects and is directly related to the photodiode bias, is controlled by the controller 36. The controller 36 is electrically coupled to the data lines 54, the scan circuitry 28, and to the common contact 77. The controller 36 may change the common contact potential in accordance with the desired application.

Referring now to FIG. 3, a plan view diagram of an x-ray detector 110, having split scan lines 112 and non-split and combined data lines 114 with pixels 116 coupled to both a first side 118 and a second side 120 of the data lines 114, in accordance with another embodiment of the present invention is shown. The scan lines 112 are alternating full-length split scan lines, which are coupled to the scan drivers 121 of the drive circuitry A2 and B2. Although the data lines 114 are full-length data lines like the data lines 54, there is half the number of data lines 114 as there are data lines 54.

The pixels 116 are arranged in a split design, but rather than the pixels 116 being split into a left half and a right half, such as the pixels in the embodiments of FIG. 2, the pixels 116 are split into a first group 122 and a second group 124. The first group 122 and the second group 124 alternate pixels by column.

The scan lines 112 are considered split because they are coupled to and control half the number of pixels along any given row of pixels along the horizontal axis (not shown), which extends parallel to the scan lines 112. For example, the scan line 126 extends along pixels 128, but is only coupled to pixels 130. The connection pitch for the scan lines 112 is approximately the same as the above-described detector 50. Although the adjacent scan lines, such as scan lines 132, are shown as being spaced apart from each other, the adjacent scan lines may be "stacked" on top of each other so as to maximize the photodiode fill factor. When the adjacent scan lines are stacked, the adjacent stacked scan lines are spaced apart or separated by an insulating material, in a direction orthogonal to the plane of the detector 110. The separation or insulating material assures that there is not a conductive connection between the adjacent scan lines, similar to the separation between the scan lines 112 that are not stacked.

Half the number of data lines 114 is utilized since the pixels 122 and 124 share common data lines. The connection pitch of the data lines 114 is approximately half of the connection pitch of the above-described detector 50. Half the connection pitch increases ease in manufacturing of a detector, due to reduced manufacturing tolerance restrictions. The length of the data lines 114 is half the length of the data lines 54, since the data lines 114 only extend the length of the detector 110 and are not combined with any other data lines. Thus, the data lines 114 provide reduced capacitance and resistance as compared to the data lines 54 and the data lines of prior art. Reduced capacitance and resistance provides reduced noise performance of the readout channels.

The detectors 50 and 110 may be operated in an alternating mode or in a "binned" mode. The binned mode refers to the combining of multiple pixels in a single read; this is described in further detail below. The alternating mode provides higher resolution than the binned mode, which will support faster acquisition frame rates.

In the alternating mode, with respect to the embodiments of FIGS. 2 and 3, drive circuitry A1 or A2 is activated first followed by drive circuitry B1 or B2. A first pixel, in the left half 60 or in the first group 122, is read followed by a second pixel, that is on the same data line as the first pixel and is in the right half 62 or in the second group 124. Alternatively, all of the scan driver circuitry A1 or A2 can be activated in sequence before any of the scan driver circuitry B1 or B2 is activated. The same is true for the reverse order. With respect to the embodiment of FIG. 4, pixels on the same split scan line and on the same combined data line may be read using a sequential technique similar to that described above.

In the binned mode, multiple scan drivers are activated simultaneously. For example, with respect to the embodiment of FIG. 2, two scan drivers in the drive circuitry A1 may be activated simultaneously followed by two scan drivers in the drive circuitry B1. Thus, one readout channel may acquire the charge from two pixels in the left half 60 simultaneously followed by two pixels in the right half 62, simultaneously. In addition, the signal from two adjacent readout channels are combined, in a digital fashion, either by the readout electronics or by the electronics following the readout electronics, resulting in a single large pixel formed through a combination of four smaller pixels. The four pixels form a 2×2 square, in effect retaining the same aspect ratio as an individual pixel. The individual charges of the two pixels are combined on each of two common data lines and are acquired in analog summing fashion. Upon combining the individual charges the digital data from adjacent data lines are then digitally summed.

For the stated embodiments, the binning of the pixels increases acquisition frame rates at the expense of spatial resolution, without reduced field size. The amount of data acquired, using the binned mode, for a resulting image is less, and thus less image storage space is required. In the embodiment of FIG. 3, four scan lines are activated simultaneously, two from drive circuitry A2 and two from drive circuitry B2. This is done in such a manner to activate the pixels along two adjacent rows in FIG. 3. In other words, four pixels on each data line are read simultaneously, resulting in a solely analog signal combination, eliminating the need for digital summation circuitry in the readout electronics or anywhere else. In so doing, the stated embodiment therefore further reduces power consumption and costs when used in the binned mode.

Figure 4:
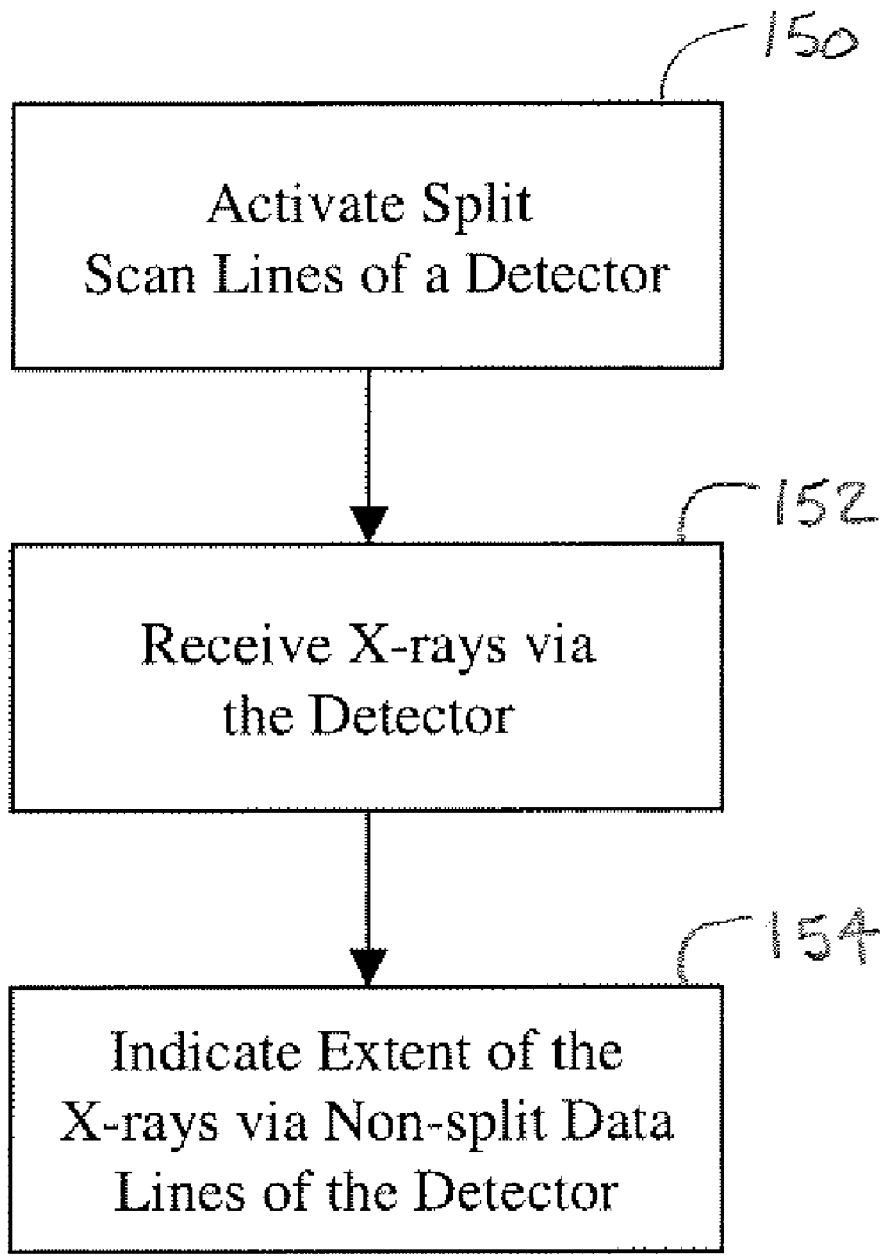
FIG. 4 is a logic flow diagram illustrating methods of operating an x-ray detector in accordance with multiple embodiments of the present invention.

Referring now to FIG. 4, methods of operating an x-ray detector in accordance with multiple embodiments of the present invention are shown. In step 150, the pixels of a detector, such as the pixels of the detectors 50 and 110, are activated via one or more split scan lines. The pixels are scrubbed or read, which allows charge from the read-out electronics to charge each pixel to a given potential via the data lines. In step 152, the photodiodes of the detector are exposed and receive x-rays. In step 154, the extent of the x-rays are read by or indicated via one or more non-split data lines, such as the combined data lines 54 and the data lines 114.

The above-described steps are meant to be an illustrative example; the steps may be performed synchronously, sequentially, simultaneously, or in a different order depending upon the application.

The present invention provides multiple x-ray detectors that may be applied in various applications. The x-ray detectors have varying degrees, levels, and quantities of resolution, pixel connection pitch, scan driver channels, readout circuitry channels, noise performance, data line capacitance and resistance, power consumption, and heat generation. The detectors of the embodiments of the present invention provide a reduced amount of readout circuitry, reduced power consumption, reduced heat generation, and reduced detector and power supply weight, as well as improved noise performance and reliability over detectors of prior art.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

The invention claimed is:

1. An x-ray detector comprising:
    a plurality of pixels receiving x-rays;
    at least one split scan line activating said plurality of pixels, each of said at least one split scan line having a plurality of separated activation lines; and
    at least one data line conducting charge indicative of said x-rays.

2. A detector as in claim 1 wherein at least one data line comprises at least one non-split data line.

3. A detector as in claim 1 wherein at least two data lines of said at least one data line are coupled to each other.

4. A detector as in claim 1 wherein said at least one split scan line is vertically stacked.

5. A detector as in claim 1 wherein said at least one data line comprises:
    a first side coupled to a first set of pixels; and
    a second side coupled to a second set of pixels.

6. A detector as in claim 1 wherein said plurality of data lines comprise:
    a first set of data lines; and
    a second set of data lines;
    wherein at least one data line from said first set of data lines is coupled to at least one data line from said second set of data lines.

7. A detector as in claim 6 wherein each data line in said first set of data lines is coupled to a data line in said second set of data lines.

8. A detector as in claim 6 wherein said at least one split scan line has a first pixel scan set and a second pixel scan set.

9. A detector as in claim 8 wherein said first set of data lines correspond with said first pixel scan set and said second set of data lines correspond with said second pixel scan set.

10. An x-ray detector comprising:
    a plurality of pixels receiving x-rays;
    at least one scan line activating said plurality of pixels; and
    a plurality of data lines conducting charge indicative of said x-rays, said plurality of data lines having at least two data lines that are coupled to each other;
    wherein at least one data line of said plurality of data lines comprises;
    a first side coupled to a first set of pixels; and
    a second side coupled to a second set of pixels.

11. An x-ray system comprising:
    an x-ray detector comprising;
    a plurality of pixels receiving x-rays;
    at least one split scan line activating said plurality of pixels, each of said at least one split scan line having a first pixel scan set and a second pixel scan set; and
    at least one data line conducting charge indicative of said x-rays;
    a readout circuit electrically coupled to said at least one data line and generating x-ray signals in response to said indication; and a controller electrically coupled to said readout circuit and generating an x-ray image in response to said x-ray signals.

12. A system as in claim 11 wherein said at least one split scan line comprises;
a first set of scan lines; and
a second set of scan lines.

13. A system as in claim 12 further comprising:
a first drive circuit coupled to said first set of scan lines; and
a second drive circuit coupled to said second set of scan lines.

14. A system as in claim 13 wherein said first drive circuit and said second drive circuit comprise a plurality of scan drivers.

15. A system as in claim 14 wherein said at least one data line comprises at least one non-split data line.

16. A system as in claim 11 wherein said at least one data line comprises:
a first set of data lines; and
a second set of data lines.

17. A system as in claim 16 wherein at least one data line in said first set of data lines shares an integrator with at least one data line in said second set of data lines.

18. A method of operating an x-ray detector comprising:
activating a plurality of pixels via at least one split scan line, each of said at least one split scan line having a plurality of separated activation lines that are associated with a row of said plurality of pixels;
receiving x-rays; and
indicating extent of said x-rays via at least one data line.

19. A method as in claim 18 further comprising alternating pixels between a first half and a second half of said at least one split scan line.

20. A method as in claim 18 further comprising reading a first set of pixels coupled to a first half of said at least one split scan line before reading a second set of pixels coupled to a second half of said at least one split scan line.

21. A method as in claim 18 further comprising reading pixels coupled to a first half of scan lines of said at least one split scan line before reading pixels coupled to a second half of scan lines of said at least one split scan line.

22. A method as in claim 18 further comprising alternating pixels on said at least one data line.

23. A method as in claim 18 further comprising combining at least two pixels of said plurality of pixels.

24. A method as in claim 18 further comprising analog binning of adjacent pixels of said plurality of pixels.

25. A method as in claim 24 wherein said adjacent pixels are on separate halves of said at least one split scan line.

26. A method as in claim 24 wherein said adjacent pixels are on a common data line.

* * * * *